(12) United States Patent  
Mercier

(10) Patent No.: US 7,168,643 B2
(45) Date of Patent: Jan. 30, 2007

(54) LEAF SNATCHER

(76) Inventor: Pierre Mercier, 7675 Johanne, Laprairie, Quebec (CA) J5R3X8

( * ) Notice: Subject to any disclaimer, the term of this patent is extended or adjusted under 35 U.S.C. 154(b) by 505 days.

(21) Appl. No.: 10/844,918

(22) Filed: May 12, 2004

(65) Prior Publication Data

US 2005/0051648 A1    Mar. 10, 2005

Related U.S. Application Data

(60) Provisional application No. 60/500,006, filed on Sep. 5, 2003.

(51) Int. Cl.
*A01D 34/90* (2006.01)
*A47J 42/00* (2006.01)
*A47J 43/00* (2006.01)

(52) U.S. Cl. .................. 241/169.1; 56/330
(58) Field of Classification Search ............ 241/169.1; 56/255, 256, 328.1, 330, 331; 30/347
See application file for complete search history.

(56) References Cited

U.S. PATENT DOCUMENTS

| 4,472,929 | A  | * | 9/1984  | MacCanna et al. | ........ 56/327.1 |
| 6,834,487 | B2 | * | 12/2004 | Pellenc et al.  | ............ 56/330 |
| 7,096,654 | B2 | * | 8/2006  | Pellenc         | ............ 56/330 |

FOREIGN PATENT DOCUMENTS

| CH | 20010000855    |    | 5/2001  |
| CH | 694311 A5      | *  | 11/2004 |
| GB | 2079625 A      | *  | 1/1982  |
| WO | WO02091863     |    | 11/2002 |
| WO | WO 02091863 A1 | *  | 11/2002 |
| WO | WO 2005086987 A1 | * | 9/2005 |

* cited by examiner

*Primary Examiner*—Bena Miller
(74) *Attorney, Agent, or Firm*—ROBIC; Gonzalo Lavin

(57) ABSTRACT

The present invention discloses a leaf snatcher consisting of a protective grille, a blade activated by a motor. The blade is shaped so as to have vacuum capabilities to suck the unwanted leaves and debris. The leaf snatcher is generally setup over a waste container to receive the leaves and debris sucked by the blade. When the grille is lifted, it automatically stops the blade for increased safety.

16 Claims, 2 Drawing Sheets

Figure 1:
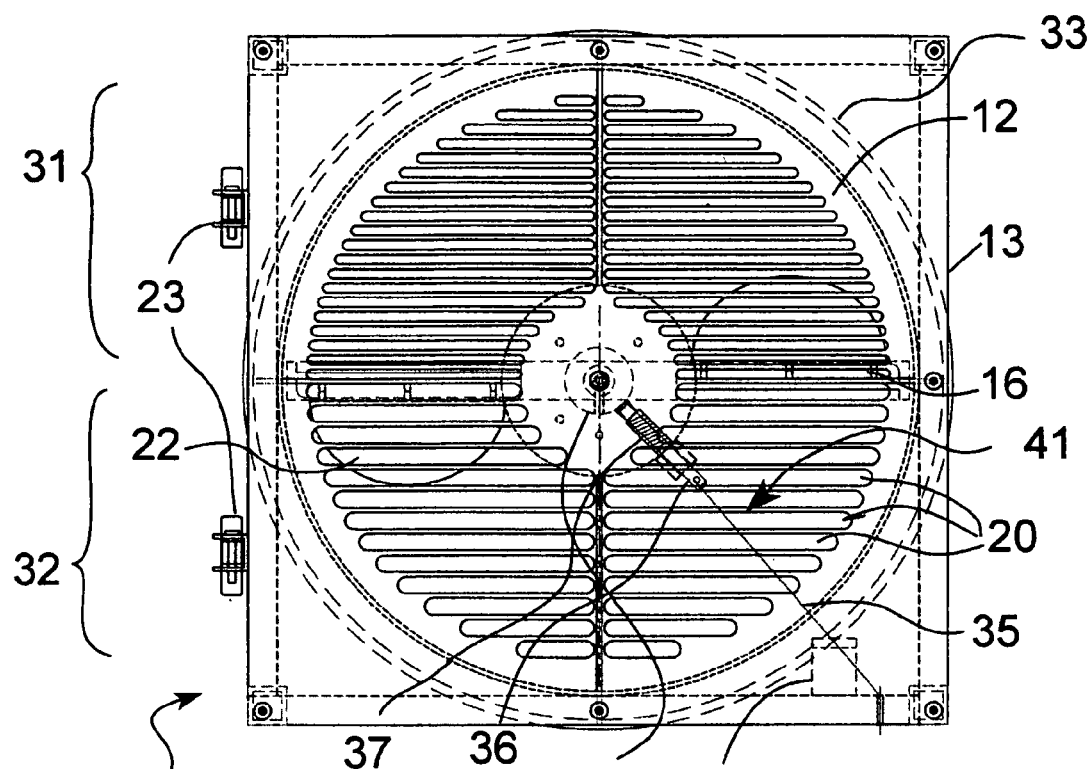

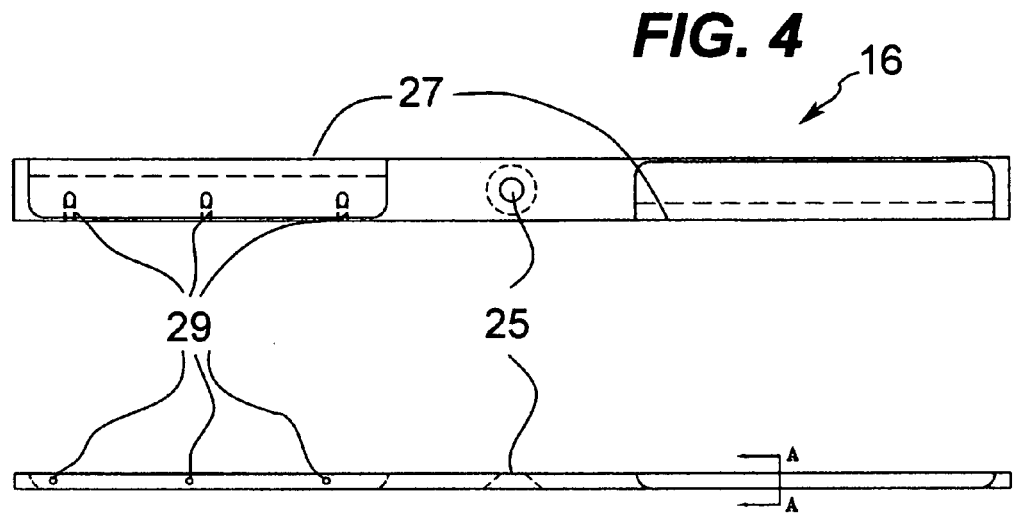
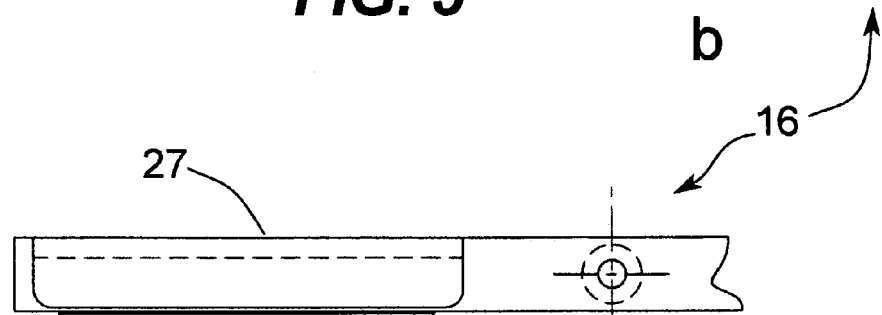
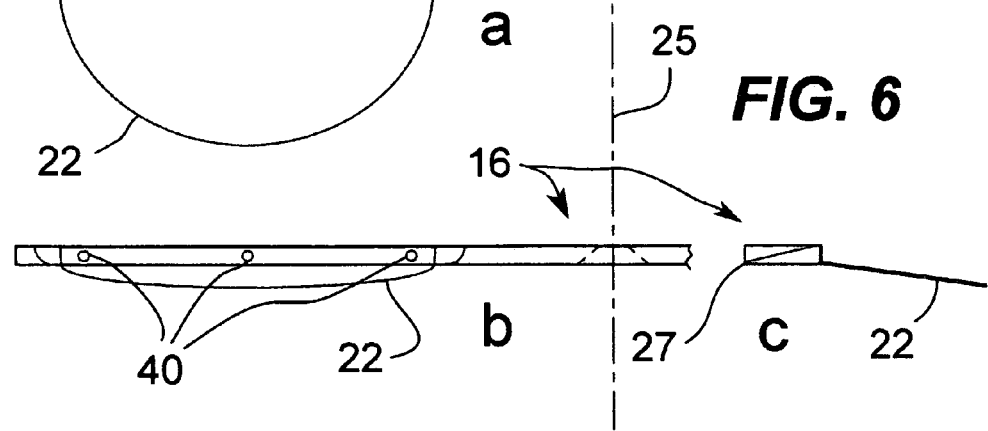

LEAF SNATCHER

This application claims priority base on provisional application 60/500,006 filed Sep. 05, 2003

BACKGROUND OF THE INVENTION

1. Field of the Invention

The invention relates generally to shredders but more particularly to a shredder that removes leaves with minimal damage to the plant.

2. Background of the Invention

There exists many shredders designed for shredding branches and even trees. These shredders will take up the entire plant or part of a plant or tree that is presented to it and totally pulverize it into mulch.

When only a part of a plant needs to be taken away, such as leaves while keeping the fruit or the bud, such as for medicinal plants, the prior art has revealed a number of machines that perform that task such as patent application WO02091863, from CH20010000855 filed May 11, 2001 by Bonny and Singy which shows a machine using a rotating blade to cut off unwanted leaves and a separate turbine to suck and then eject the unwanted by-products. Devices of the prior art can be subject to jamming as they do not adequately dispose of unwanted debris or have the debris jam in the turbine vanes.

There is therefore still room for improvement in the creation of a device which removes only specific parts of a plant, while causing minimal damage to the rest of the plant, does so safely, quickly and with no jamming.

SUMMARY OF THE INVENTION

It is a first object of this invention to increase overall productivity in the leaf snatching procedure.

It is a second object of this invention to provide for a simple to use device for snatching leaves.

It is a third object of this invention to provide for a leaf snatcher having a blade system that sucks away leaves and other debris.

It is a fourth object of this invention to provide for a leaf snatcher that is lightweight and easily transportable.

It is a fifth object of this invention to provide for a leaf snatcher equipped with safety features such as power cut-off, motor brake, and bevelled blade.

The present invention discloses a leaf snatcher consisting of a protective grille, a blade activated by a motor. The blade is shaped so as to have vacuum capabilities to suck the unwanted leaves and debris. The leaf snatcher is generally setup over a waste container to receive the leaves and debris sucked by the blade. When the grille is lifted, it automatically stops the blade for increased safety.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

Figure 2:
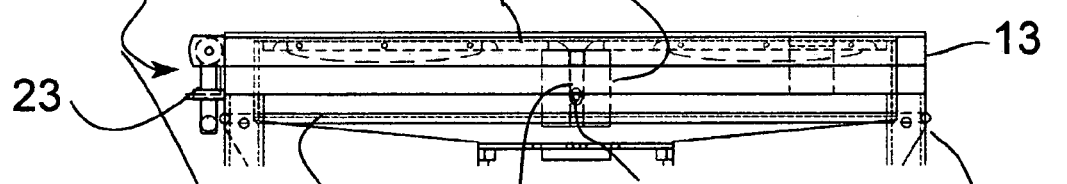
Figure 3:
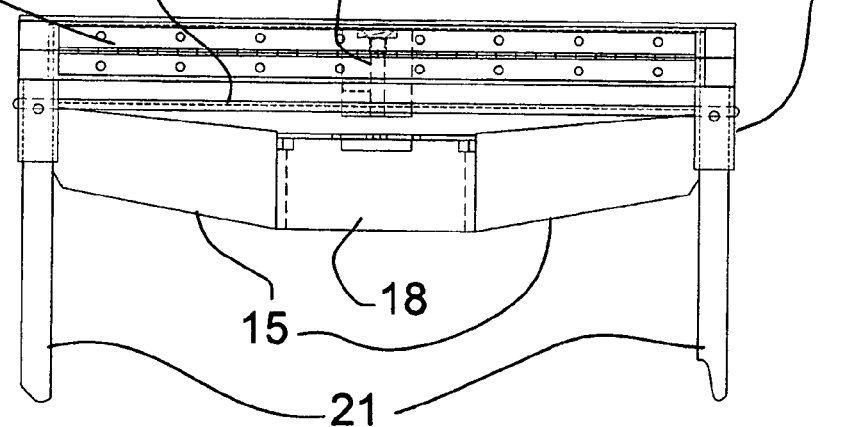

FIG. 1 Top view of the leaf snatcher.
FIG. 2 Side view of the leaf snatcher.
FIG. 3 Rear view the leaf snatcher.
FIG. 4 Top view of the blade.
FIG. 5ab Side view the blade across the length and across the width along A—A, respectively.
FIG. 6abc Partial top and side views of blade with vane, and side view, respectively.

DETAILED DESCRIPTION OF THE PREFERRED EMBODIMENT

Referring generally to FIGS. 1–3, a leaf snatcher (10) has a protective grille (12) mechanically fastened to a grille frame (13). The grille frame is hingedly attached to a frame structure (14) by way of a hinge (19) which in large part defines the leaf snatcher (10). From the frame structure extends downwardly support legs (21) which are easily removable for transport or storage. The grille (12), besides a hinge (19) has retaining means (23) to maintain the grille frame (13) shut. A snap ring (33) (in dotted lines) is used for snapping a mesh type bag (not shown). The bag has an adjustable ring configured to frictionally engaged over the snap ring. It is important that the bag be of such a design as to allow air to pass through. These elements of the bag are, however, well known in the art and bags of that nature are readily available for other applications.

Referring generally to FIGS. 4–6, underneath the grille (12) (partially visible in FIG. 1) is a blade (16) which has an axis of rotation, two long generally parallel sides each having a sharp section (27). Opposite the sharp section (27) are holes (29) to receive mechanical fasteners (40) used for mechanically fastening a vane (22). The blade (16) has a bevel (39) situated on the top side so as to prevent the sharp section (27) from hitting the grille (12). The blade (16) with its vanes (22) has two functions, the first being to cut and the second being to act as suction means to suck down debris. To do that second function, are the vanes (22) which extend generally perpendicularly along each longitudinal sides of the blade (16), and can be semi-circular in shape as per the figures or could be square, rectangular, in the shape of a quarter circle or any other suitable shapes which create adequate suction through the grille (12) as well as enough of a blow once debris has passed the vanes (22) so as not to create a jam, while at the same time not creating too much strain on the motor. It should be understood that various shapes for the vanes (22) are possible all within the scope of this instant invention. Also, the vanes (22) can either extend integrally from the blade (16) or be mechanically fastened or even welded to the blade (16). As seen in FIG. 6c, the vanes (22) are slightly offset in view of the horizontal plane so as to generate a suction effect as is done for fan blades, propellers and the like. An angle of a range approximately between 10–35 degrees is generally adequate for creating proper suction but other angles can be considered depending upon various factors such as motor strength, vane size and shape, all within the scope of the present invention. A motor (not shown) situated inside a motor housing (18) activates the blade (16) by way of a shaft (11) interfacing the motor to the blade (16). The motor housing is connected to the frame structure (14) by way of members (15). At least one threaded pin (17), preferably a plurality, are threading through the motor housing (18) and making contact with the motor (not shown) for use in aligning the motor (not shown)

so that it will position the blade (16) parallel to the grille (12). Over time, misalignement can occur so it is important to be able to make such an adjustment easily. In use, the leaf snatcher (10) is setup on its legs (21) and the bag having an adjustable ring is snapped onto the snap ring (33) to receive the debris sucked by the blade (16).

Wiggling plants on top of the grille (12) so as to present all parts of the plant to the grille (12) selectively passes parts of the plant so as to separate desirable parts from undesirable debris sucked away by the sucking action of the blade (16). The grille (12) has a plurality of slots (20) configured and sized to allow passage of leaves and not the parts of the plant a user wants to keep. The grille (12) is interchangeable so that various sized slots (20) can be fitted on the leaf snatcher (10). Also, as shown in FIG. 1, a single grille (12) can have two or more sections (31, 32)) of differently sized slots (20) to increase its versatility and reduce the need for changing grilles (12) according to what has to be removed from the plant.

When the grille frame (13) is opened, two safety mechanisms are triggered, the first being a conventional cutoff switch (not shown) which reacts to the lifting of the grille frame (13), and the second is a braking system (41) which makes contact with a hub (34) frictionally attached to and surrounding the shaft (11). A string (35) pulls on a brake pin (36) which is biased by a biasing means (37) into frictionally engaging the hub (34). When the grille frame (13) is closed, an <<L>> shaped stem (38), presses down against the string (35) which pulls the brake pin (36) which does not make contact with the hub (34), but when the grille frame (13) is lifted, the <<L>> shaped stem (38), which is fixedly attached to the grille frame (13), no longer presses down on the string (35) and the pin (36) is biased back into frictionally engaging the hub (34).

The invention claimed is:

1. A leaf snatcher comprising a frame structure; a grille structure hingedly attached to said frame structure; said grille structure having a protective grille mechanically fastened to said grille structure; said grille having slots configured and sized to selectively pass parts of a plant; a motor situated inside a motor housing underneath said grille and actuating a blade by way of a shaft; said motor housing being connected to said frame structure by way of members; a safety cutoff switch to cut power to said motor and said leaf snatcher having the following improvement:
said blade having vanes extending therefrom to combine cutting means and suction means.

2. A leaf snatcher as in claim 1 wherein:
said grille structure being hingedly attached to said frame structure by way of a hinge.

3. A leaf snatcher as in claim 1 wherein:
support legs, used for installing said leaf snatcher over a container, extending downwardly from said frame structure.

4. A leaf snatcher as in claim 1 wherein:
said grille having retaining means to maintain said grille frame shut.

5. A leaf snatcher as in claim 1 wherein:
said blade having an axis of rotation, two long generally parallel sides each having a sharp section; and opposite said sharp sections, said vanes extending generally perpendicularly along each longitudinal sides of said blade.

6. A leaf snatcher as in claim 1 wherein:
holes opposite said sharp sections to receive mechanical fasteners used for mechanically fastening said vanes.

7. A leaf snatcher as in claim 1 wherein:
said vanes generally semi circular in shape.

8. A leaf snatcher as in claim 1 wherein:
said vanes offset in view of the horizontal plane so as to generate a suction effect.

9. A leaf snatcher as in claim 1 wherein:
said vanes offset in view of the horizontal plane at an angle of between 10–35 degrees.

10. A leaf snatcher as in claim 1 wherein:
said grille being interchangeable so that various sized slots can be fitted on said leaf snatcher.

11. A leaf snatcher as in claim 1 wherein:
said grille having two or more sections of differently sized slots.

12. A leaf snatcher as in claim 1 wherein:
a braking system to brake said blade.

13. A leaf snatcher as in claim 12 wherein:
said braking system having a string pulling on a brake pin, said brake pin being biased by a biasing means into frictionally engaging a hub and said hub frictionally attached to and surrounding a shaft; when a grille frame is being closed, an L shaped stem, fixedly attached to said grille frame in turn pulling said pin so that it does not make contact with said hub; and when said grille frame being lifted, said L shaped stem not pressing down on said string so that said pin being biased back into frictionally engaging said hub.

14. A leaf snatcher as in claim 1 wherein:
said blade having a bevel situated on the top side so as to prevent said sharp section from hitting said grille.

15. A leaf snatcher as in claim 1 wherein:
a snap ring snapping a mesh type bag.

16. A leaf snatcher as in claim 1 wherein:
at least one threaded pin threading through said motor housing and making contact with said motor to align said motor so as to position said blade parallel to said grille.

* * * * *

(12) EX PARTE REEXAMINATION CERTIFICATE (9771st)
United States Patent
Mercier

(10) Number: US 7,168,643 C1
(45) Certificate Issued: Jul. 26, 2013

(54) LEAF SNATCHER

(75) Inventor: Pierre Mercier, Laprairie (CA)

(73) Assignees: Fiducie Familiale Andre Mercier, Valleyfield, QC (CA); Fiducie Familiale Pierre Mercier, La Prairie, QC (CA)

Reexamination Request:
No. 90/011,611, Mar. 31, 2011

Reexamination Certificate for:
Patent No.: 7,168,643
Issued: Jan. 30, 2007
Appl. No.: 10/844,918
Filed: May 12, 2004

Related U.S. Application Data

(60) Provisional application No. 60/500,006, filed on Sep. 5, 2003.

(51) Int. Cl.
*A01D 34/90* (2006.01)
*A47J 42/00* (2006.01)
*A47J 43/00* (2006.01)
*A01D 46/00* (2006.01)

(52) U.S. Cl.
CPC .................................. *A01D 46/005* (2013.01)
USPC .......................................... 241/169.1; 56/330

(58) Field of Classification Search
None
See application file for complete search history.

(56) References Cited

To view the complete listing of prior art documents cited during the proceeding for Reexamination Control Number 90/011,611, please refer to the USPTO's public Patent Application Information Retrieval (PAIR) system under the Display References tab.

*Primary Examiner* — Cary Wehner

(57) ABSTRACT

The present invention discloses a leaf snatcher consisting of a protective grille, a blade activated by a motor. The blade is shaped so as to have vacuum capabilities to suck the unwanted leaves and debris. The leaf snatcher is generally setup over a waste container to receive the leaves and debris sucked by the blade. When the grille is lifted, it automatically stops the blade for increased safety.

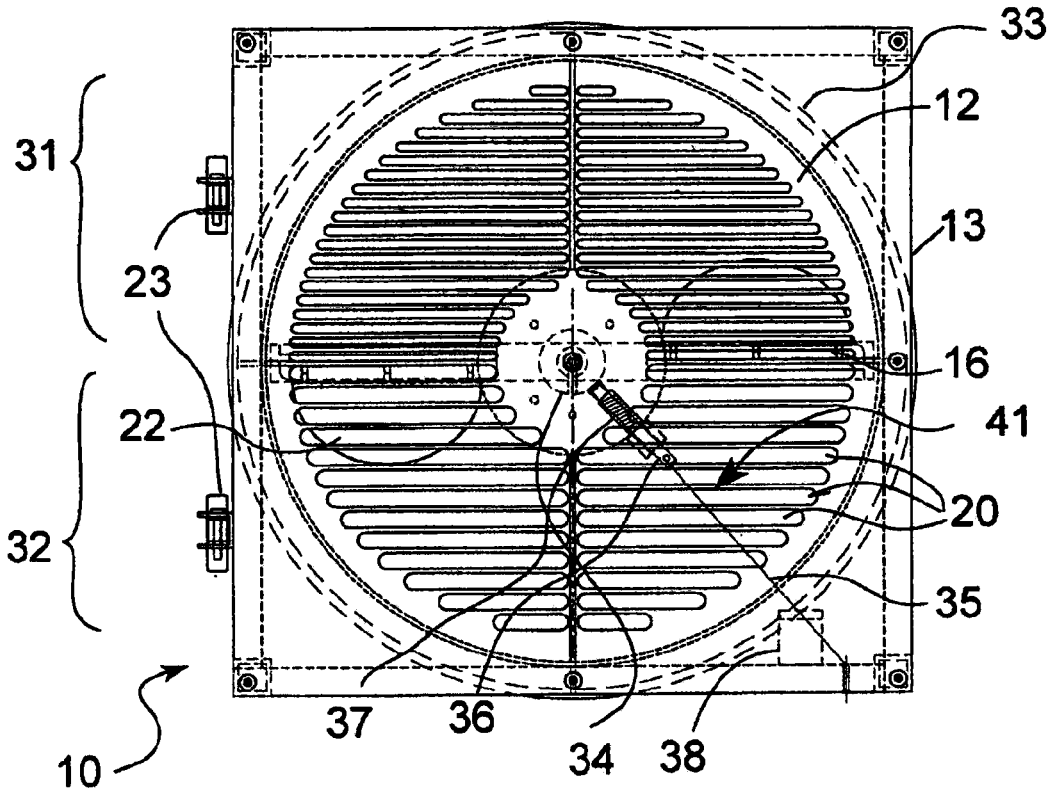

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 3, 5, 6, 8, 9 and 17-22 are cancelled.
Claims 2, 4, 7 and 10-16 were not reexamined.

\* \* \* \* \*